June 16, 1959 R. R. HAWKINS 2,891,174
ELECTRONIC INTEGRATOR
Filed April 8, 1957
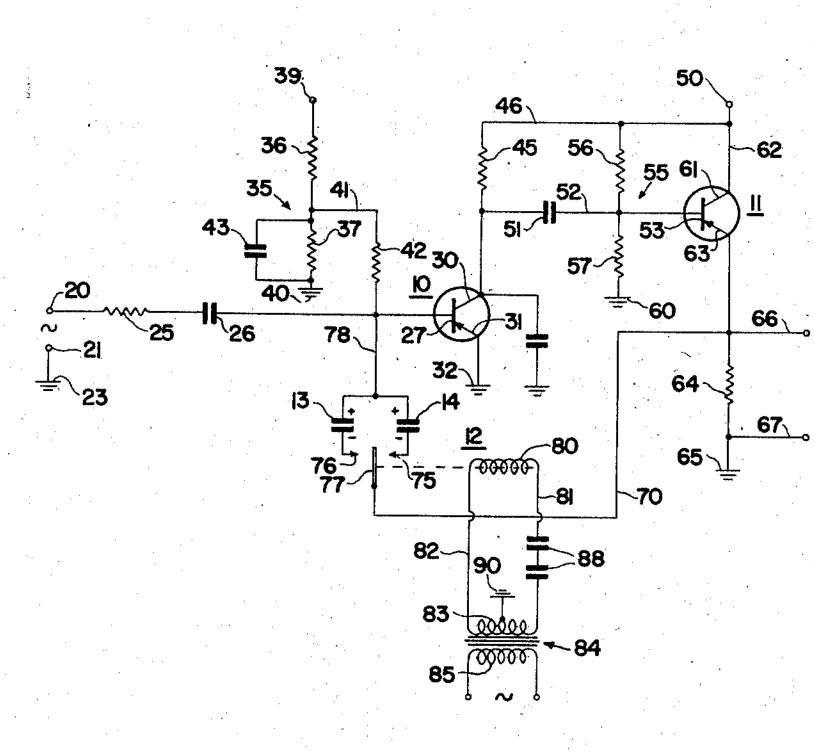
INVENTOR.
ROYAL R. HAWKINS
BY Joseph E. Ryan
ATTORNEY United States Patent Office 2,891,174
Patented June 16, 1959

2,891,174

ELECTRONIC INTEGRATOR

Royal R. Hawkins, Bloomington, Minn., assignor to Minneapolis-Honeywell Regulator Company, Minneapolis, Minn., a corporation of Delaware Application April 8, 1957, Serial No. 651,195

11 Claims. (Cl. 307—88.5)

My invention relates to alternating current integrating apparatus and more particularly to an improved alternating current type integrating circuit.

In the past resistance capacitance circuits known as resistance capacitance circuits have been utilized for performing integrating functions. For the most part these circuits have been restricted to application of direct current signals. This limited the application of this type of integrator to circuit apparatus of the direct current type or if an alternating current main circuit was used, it necessitated the insertion of demodulators and modulators or rectifiers to convert the signal to be integrated to direct current and reconvert the same to be adaptable for such control circuits. Recent advances in alternating current circuit components have increased the desirability of using alternating current in control circuits. Where control signals are to be integrated, in alternating current circuits it is extremely desirable from the standpoint of simplicity and economy as well as wider ranges of control to perform the integration on the alternating current signals directly and eliminate the need for modulating and demodulating equipment. It is further desirable that the range of signals to be integrated not be limited by the resistance and capacitance components of an integrating network, and in the present invention the limitations on the integrator are only those of the saturation of the amplifying equipment associated therewith. It is therefore an object of this invention to provide an improved alternating current type integrating circuit. It is further an object of this invention to provide in an alternating current integrating circuit an arrangement which permits a linear charge rate to be maintained which is substantially unaffected by the condition of the charge on the condenser approaching the level of the input signal. A further object of this invention is to provide an improved alternating current integrator circuit which maintains linear operation over an extremely wide range of voltage signal inputs. These and other objects of this invention will become apparent from the reading of the attached description together with the drawing. The single figure of the drawing shows the integrator circuit of this invention.

My improved alternating current integrator circuit as shown in the drawing is of the feedback type which utilizes a pair of amplifier stages 10 and 11 in which the output of the amplifier is fed back through a vibrator or synchronous chopper indicated generally at 12 to connect in feedback with the input of the amplifier a pair of capacitors 13 and 14 which are energized in the feedback path to modify the input signal and reflect to the output of the amplifier an integration of the input signal. Specifically the terminals 20 and 21 represent the input to the integrator, the terminal 21 being grounded as at 23 and the terminal 20 connected through a current limiting resistor 25 and a coupling condenser 26 to a base element 27 of a transistor forming the first amplifying stage 10 of the integrator. The first amplifying stage 10 or transistor includes a collector 30 and an emitter 31, the emitter being grounded as at 32. Base 27 also has connected to it a reference signal from a potential divider arrangement indicated generally at 35 and including resistors 36, 37 which is serially connected between a voltage reference source indicated at voltage reference terminal 39 and a ground connection 40. The mid-point of the resistor 36, 37 is connected through a conductor 41 and a biasing resistor 42 to the base 27 of the amplifier. The resistor 37 has a bypass or filter condenser 43 connected in parallel therewith for filtering purposes. The collector 30 of the amplifying stage 10 is connected through a load resistor 45 and a conductor 46 to a bias terminal or supply 50 and is also coupled through a condenser 51 and conductor 52 to a base 53 of the second amplifying stage or transistor 11. Also connected to the base 53 is a potential dividing or voltage reference circuit 55 comprised of resistors 56, 57 which are connected between the conductor 46 and a ground 60 with their common point connected to the base 53. Amplifying stage 11 or transistor 11 includes a collector 61 which is connected directly to the bias terminal 50 through a conductor 62. Transistor 11 also includes an emitter 63 connected through an emitter resistor 64 to ground 65 across which output leads 66 and 67 are connected.

The feedback circuit from the output of amplifier or transistor 11 is from the emitter resistor circuit and includes the conductor 70 connected to a movable contact 77 of the vibrator or synchronous chopper 12 which has stationary contacts 76, 75 respectively connected to the condensers or capacitors 13 and 14, respectively, with the like plate shown here as the plus terminals of the condensers connected in common through a conductor 78 to the base 27 of the transistor 10 on the first stage of amplification. The synchronous vibrator or chopper has a coil 80 designed to move the movable element 77 between the stationary contacts 76, 75 in a conventional manner and with a definite off-time or period existing between the make positions of the contacts 75, 77 and 77, 76 respectively. The coil 80 is connected through conductors 81, 82 to a secondary winding 83 of an energizing transformer 84 whose primary 85 is connected to an alternating current signal source of the same frequency as the input signal applied to terminals 20, 21. As shown in the drawing, the conductor 81 includes some phase shifting condensers 88 designed to mitigate the lag in the operation of the vibrator to provide synchronous operation of the cycling change of the alternating supply. The secondary winding 83 is grounded at its mid-tap as at 90.

As will be seen in the drawing, the alternating current signal to be integrated is applied to the terminals 20, 21 and is amplified by a two-stage resistance capacitance coupled transistor amplifier in the form of amplifying stages 10 and 11. An emitter resistor in the emitter circuit of transistor 11 and the chopper-condenser circuit provide a feedback path from the output of the amplifier to the input of the amplifier or the base 27 of transistor 10. The synchronous vibrator which is driven by an alternating current potential of the same frequency as the input signal alternately connects the feedback path from the capacitors 13 to the capacitor 14. The like plates of the capacitors are connected together to the input of the amplifier or the base of the transistor. This arrangement utilizes a feedback around the amplifier circuit.

With the arrangement described above, a single amplifying stages and a cathode follower type output from the second stage of the amplifier provides inversion in the phase of the signal output as compared with the input signal. It should be recognized that any number of amplifying components may be utilized herein as long as this condition exists. The two capacitors utilized in the feedback circuit for integrating purposes should be substantially identical and should be of the low leakage type. While we have disclosed a mechanical vibrator herein, a synchronous switching arrangement may be substituted therefore which would alternately connect the feedback circuits in the manner defined. Considering the operation of the integrator circuit, and under conditions where no input signal is applied to the input of the amplifier, the second stage of the amplifier is adjusted such that it will conduct sufficient potential across the emitter resistor of a predetermined voltage level. Since the synchronous vibrator or equivalent synchronous switch alternately connects the capacitors 13, 14 to the emitter of the transistor 11, these capacitors would charge to a potential level of a predetermined voltage. Assuming now that a sine wave signal is applied to the input terminals and during the positive half-cycle of the sine wave signal the conduction of the transistor 10 will be reduced and the conduction of the transistor 11 would tend to increase. An increase in the conduction of the transistor 11 results in a larger potential drop across the emitter resistor 64 and the emitter will tend to become more negative. If during this half-cycle the synchronous vibrator has for example connected the condenser 13 in the feedback circuit, a charging current will tend to flow through the integrating capacitor 13 to charge the capacitor to the new emitter potential of the transistor 11. The charging current is in a direction to turn the transistor 10 on which opposes the initial signal. The abrupt rise of the signal at the input terminals is not immediately fed to the input terminals of the amplifier but gradually increases at a rate determined by the time constant of the charging circuit. This lag time is also introduced when the error signal is removed. During the second half-cycle of input signal, that is the negative going half-cycle, the synchronous vibrator connects the capacitor 14 into the feedback circuit. This half-cycle of the signal causes the transistor 11 to conduct less whereupon the integrating capacitor 14 begins to discharge from its quiescent voltage charge of the predetermined amount. Thus it will be seen that by switching between the two integrating capacitors 13 and 14 at the frequency of the input signal it is possible to integrate the alternating current signal directly. In the present integrating circuit, the limitation on the output of the integrator is determined only by the saturation level of the amplifier and not by the resistor capacitor components thereof. Further, the charge rate is maintained substantially constant throughout the range of operation of the integrator and does not fall off as the difference charge on the condensers 13, 14 approaches the level of the initial signal.

It will be recognized that certain modifications may be made to the above improved integrator circuit within the scope of the invention to attain the improved operation described herein. As for example a circuit or switching arrangement may be incorporated and a number of amplifier stages can be utilized, the only limitation being that the output signal being inverted from the input signal. Therefore I wish to be limited only by the scope of my appended claims.

I claim as my invention:

1. An alternating current integrator comprising, an input circuit means upon which an alternating current input signal is impressed, an amplifier means connected to said input circuit means and including an output circuit means, a pair of identical capacitors connected together and to said input circuit means, a synchronous vibrator connected to an alternating current source of the same frequency of the input signal and operating in synchronism therewith, and feedback circuit means including said synchronous vibrator alternately connecting said output circuit means to said pair of capacitors such that a feedback path is alternately connected through said capacitors to said input circuit means.

2. An alternating current integrator comprising, an input circuit means upon which an alternating current input signal is impressed, a two-stage resistance capacitance coupled transistor amplifier connected to the input circuit means and including an output circuit means, a pair of identical capacitors each having one terminal connected together and to said input circuit means, a synchronous vibrator connected to an alternating current source of the same frequency of the input signal, and feedback circuit means including said synchronous vibrator connecting the output circuit means of said amplifier to the noncommon terminals of said capacitors such that a feedback path is alternately connected through said capacitors to said input circuit means upon operation of said vibrator.

3. An alternating current integrating apparatus comprising, an input circuit upon which an alternating current input signal is impressed, a two-stage resistance capacitance coupled transistor amplifier including a base for a first stage connected to said input circuit means and an emitter circuit in a second stage of the amplifier means including an emitter resistor in an output circuit means, a synchronous vibrator connected to an alternating current source of the same frequency as the input signal and operating in synchronism with a variation in the input signal, and feedback circuit means connecting said emitter resistor of the output circuit for said resistance capacitance coupled transistor amplifier through said vibrator and a pair of condensers to said input circuit such that the condensers are alternately connected to said input circuit means.

4. An alternating current integrating network, including an input circuit means upon which an alternating current signal to be integrated is impressed, amplifier means connected to said input circuit means and including an output circuit means, a pair of feedback circuits each including a capacitance adapted to be connected between the input circuit and the output of said amplifier means, means for alternately connecting said feedback circuits to said output circuit in synchronism for each half-cycle of said alternating current input signal.

5. An alternating current integrating network, including an input circuit means upon which an alternating current signal to be integrated is impressed, amplifier means connected to said input circuit means and including an output circuit means, a pair of feedback circuits each including a capacitance adapted to be connected between the input circuit and the output of said amplifier means, and means for alternately connecting one or the other of said feedback circuits in synchronism with each cyclic change of the input signal to charge the capacitors from said output circuit, the output circuit of said amplifier means having impressed thereon the difference in voltage charge on said capacitors.

6. An alternating current integrator comprising, an input circuit means upon which an alternating current input signal is impressed, an amplifier means connected to said input circuit means and including an output circuit means, said output means being inverted in phase from said input means, a pair of identical capacitors connected together and to said input circuit means, a synchronous vibrator connected to an alternating current source of the same frequency of the input signal and operating in synchronism therewith, and feedback circuit means including said synchronous vibrator alternately connecting said output circuit means to said pair of capacitors such that a feedback path is alternately connected through said capacitors to said input circuit means.

7. An alternating current integrator comprising, an input circuit means, a plurality of stages of resistance capacitance coupled transistors forming an amplifier means connected to said input circuit means upon which an alternating current signal is impressed and including an output circuit means in which the output signal is inverted in phase from the input signal, a pair of identical capacitors connected together and to said input circuit means, a synchronous vibrator connected to an alternating current source of the same frequency of said input signal and operating in synchronism therewith, and feedback circuit means including said synchronous vibrator alternately connecting said output circuit means to each of said pair of capacitors such that a feedback path is alternately connected through said capacitors to said input circuit means.

8. An alternating current integrator comprising, an input circuit means, an even number staged resistance capacitance coupled transistor amplifier connected to the input circuit means upon which an alternating current input signal is impressed and including an output circuit means, a pair of identical capacitors each having one terminal connected together and to said input circuit means, a synchronous vibrator connected to an alternating current source of the same frequency of said input signal, and feedback circuit means including said synchronous vibrator connecting the output circuit means of said amplifier to the non-common terminals of said capacitors such that a feedback path is alternately connected through said capacitors to said input circuit means upon operation of said vibrator.

9. An alternating current integrating network, including an input circuit means upon which an alternating current signal to be integrated is impressed, amplifier means connected to said input circuit means and including an output circuit means, a pair of feedback circuits each including a capacitance adapted to be connected between the input circuit and the output of said amplifier means, and a synchronous switching means included in each of said feedback circuits for alternately connecting said feedback circuits with each cycle of said alternating current input signal.

10. An alternating current integrator for integrating alternating current signals comprising, an input circuit means upon which said alternating current signals are impressed, amplifier means connected to said input circuit means and including an output circuit in which the phase of the output signal is inverted from the input phase of the input signal, a pair of capacitors connected with like polarity terminals in common and to said input circuit means, a synchronous switching means having two make conditions and an off condition, a pair of feedback circuits including said synchronous switching means which connect the opposite extremities of said capacitors respectively for the two make condition of said switching means to said output circuit means in synchronism with the cyclic change of said alternating current input signal.

11. An alternating current integrating network, including an input circuit means upon which an alternating current signal to be integrated is impressed, amplifier means connected to said input circuit means and including an output circuit means, a pair of feedback circuits each including a capacitance adapted to be connected between the input circuit and the output of said amplifier means, and means for alternately connecting one or the other of said feedback circuits in synchronism with each cyclic change of the input signal to charge the capacitors from said output circuit, said alternating connecting means providing an open circuit condition between each cyclic connection of said feedback circuits with said input circuit, the output circuit of said amplifier means having impressed thereon the difference in voltage charge on said capacitors.

References Cited in the file of this patent

UNITED STATES PATENTS

| | | |
|---|---|---|
| 2,584,954 | Williams | Feb. 5, 1952 |
| 2,622,231 | Gray | Dec. 16, 1952 |